Figure 1:
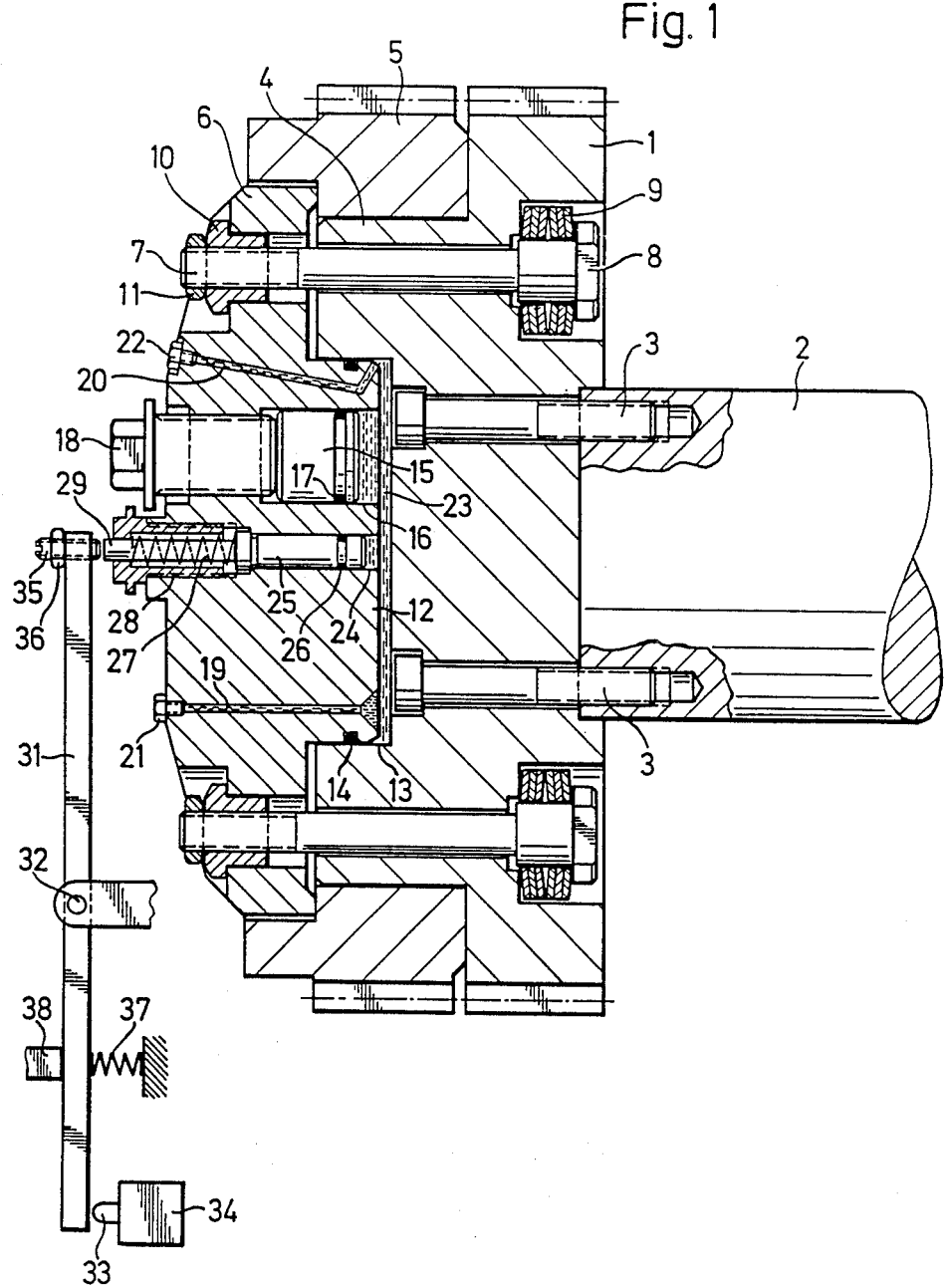

United States Patent [19]

Becker

[11] Patent Number: 4,782,717

[45] Date of Patent: Nov. 8, 1988

[54] DEVICE FOR ADJUSTING A RELATIVE ROTATIONAL POSITION OF A GEARWHEEL AND A RING GEAR WHICH ARE COAXIALLY MOUNTED

[75] Inventor: Willi Becker, Bammental, Fed. Rep. of Germany

[73] Assignee: Heidelberger Druckmaschinen AG, Heidelberg, Fed. Rep. of Germany

[21] Appl. No.: 35,066

[22] Filed: Apr. 6, 1987

[30] Foreign Application Priority Data

Apr. 4, 1986 [DE] Fed. Rep. of Germany ....... 3611324

[51] Int. Cl.$^4$ .................... B41F 13/24; F16H 55/00
[52] U.S. Cl. ...................................... 74/439; 101/248
[58] Field of Search .................. 101/229, 230, 248; 74/439, 440, 444

[56] References Cited

U.S. PATENT DOCUMENTS

| | | | |
|---|---|---|---|
| 1,340,355 | 5/1920 | Wood | 101/378 |
| 4,147,105 | 4/1979 | Becker | 101/230 |
| 4,444,106 | 4/1984 | Frenzel et al. | 101/230 |
| 4,457,231 | 7/1984 | Kawaguchi | 101/248 |

FOREIGN PATENT DOCUMENTS

| | | | |
|---|---|---|---|
| 3127539 | 6/1982 | Fed. Rep. of Germany . | |
| 8319431 | 2/1984 | Fed. Rep. of Germany . | |
| 135812 | 5/1979 | German Democratic Rep. | 101/248 |
| 58-71162 | 4/1983 | Japan . | |
| 58-78763 | 5/1983 | Japan . | |
| 2142908 | 1/1985 | United Kingdom | 101/230 |

OTHER PUBLICATIONS

Mechanisms, Linkages & Mechanical Controls, pp. 82–83, McGraw-Hill Book Co., New York, 1965.

*Primary Examiner*—Lawrence Staab
*Attorney, Agent, or Firm*—Herbert L. Lerner; Laurence A. Greenberg

[57] ABSTRACT

Device for adjusting a relative rotational position of a gearwheel and a ring gear which are coaxially mounted, comprising a device for applying a spring force to at least one of the gear wheel and the ring gear so as to form a positive connection between the gear wheel and ring gear, and an hydraulic system for reducing the applied spring force, the hydraulic system being formed of components disposed on the gearwheel.

10 Claims, 2 Drawing Sheets

DEVICE FOR ADJUSTING A RELATIVE ROTATIONAL POSITION OF A GEARWHEEL AND A RING GEAR WHICH ARE COAXIALLY MOUNTED

The invention refers to a device for adjusting a relative rotational position of a gearwheel and a ring gear which are coaxially mounted, for example and more particularly, on a turning drum of a sheet-fed rotary printing machine.

When, for example, converting sheet-fed rotary printing machines selectively to either single side or perfector printing, it is necessary to adjust the relative rotational position of the gearwheel mounted on the shaft of the turning drum and a ring gear mounted coaxially therewith. In conventional devices, during operation of the printing machine, the ring gear is meshed with the gearwheel with the aid of several releasable clamping devices arranged in the vicinity of the circumference. In this regard, considerable forces are applied in order to ensure that the rotational position of the ring gear is reliably fixed in relationship to the gearwheel during operation. In order to adjust the rotational position, the clamping devices are released, the ring gear is turned by the required angle and the clamping device is retightened, conventionally by means of screws. In heretofore known devices, it is necessary to loosen and retighten from four to six screws, respectively.

To simplify the conversion, other devices have become known heretofore as disclosed in German Patent (DE) No. 31 27 539, and Japanese Patent No. Sho 58-78763, in which the screws are turned by a common drive with gearwheels or worms. Furthermore, a device has become known heretofore from Japanese Patent No. Sho 58-71162, in which a positive connection or coupling is achieved between the ring gear and gearwheel with the aid of several clamping elements arranged in the vicinity of the circumference and which can be released by a lever from a centrally disposed screw.

The conventional devices, have the disadvantage, however, that considerable forces must be exerted in order to release the ring gear, because considerable frictional losses occur through the gear transmission and force deflection devices, respectively.

In addition, the conventional devices have the disadvantage that it is possible to start up the printing machine also if, after conversion, the ring gear is not coupled with the gear wheel with sufficient force. A result thereof is that the setting of the relative rotational position between the ring gear and the gearwheel can change during operation of the printing machine, which can result in possible damage to the printing machine.

In order to avoid the previously described disadvantages, hydraulic systems for converting a turning device to either single side or perfector printing have become known from German Utility Patent (DE-U1) No. 83 19 431. These heretofore known systems however, are rather intricate and expensive. Furthermore, in the case of these heretofore known systems, it is necessary to extend hydraulic lines from fixed machine parts to rotating parts, to which end suitable rotary seals are necessary, which have a negative effect upon the reliability and freedom from maintenance of the machine.

It is accordingly an object of the invention to provide a device for adjusting a relative rotational position of a gearwheel and a ring gear which are coaxially mounted, which avoids the foregoing disadvantages of heretofore known devices of this general type.

With the foregoing and other objects in view, there is provided, in accordance with the invention, a device for adjusting a relative rotational position of a gearwheel and a ring gear which are coaxially mounted, comprising means for applying a spring force to at least one of the gear wheel and the ring gear so as to form a positive connection between the gear wheel and ring gear, and an hydraulic system for reducing the applied spring force, the hydraulic system being formed of components disposed on the gearwheel.

The device according to the invention offers the advantage that relatively low forces are required to adjust the relative rotational position of the gearwheel and the ring gear. This greatly facilitates the operation or servicing of the printing machine. In addition, rotary seals which are prone to failure or breakdown, such as in conventional hydraulic adjustment devices, are no longer necessary.

In accordance with another feature of the invention, the hydraulic system comprises a pressure cylinder and a working cylinder communicating with one another and having a respective piston therein, and means for monitoring pressure in at least one of the cylinder.

This construction facilitates automatic cut-out or switch-off of the power supply to the drive of the printing machine during the conversion or changeover operation.

In accordance with a further feature of the invention, the gearwheel is formed with an annular extension wherein the ring gear is rotatably mounted, a plurality of spring loaded clamping elements clamping the ring gear between the gearwheel and a clamping disc disposed parallel to the plane of the gearwheel, the annular extension being formed with an inner chamber defining the working cylinder, and the clamping disc having a cylindrical extension forming the piston in the working cylinder.

This construction represents a simple yet reliable embodiment of the device according to the invention featuring only a few moving parts.

In accordance with an additional feature of the invention, whereby a reduction of the force necessary for changing over or converting the machine is achieved, the pressure cylinder has a smaller diameter than the diameter of the working cylinder and is formed as a borehole in the clamping disc.

In accordance with an added feature of the invention, the device includes a thrust bolt operatively engageable with the piston in the pressure cylinder for shifting the pressure-cylinder piston.

In accordance with yet another feature of the invention, the thrust bolt is constructed as a torque bolt. An impermissible high pressure resulting from overtightening a thrust bolt can thus be avoided with a torque bolt.

In accordance with yet a further feature of the invention, the pressure monitoring means comprises a pressure measuring cylinder and a pressure measuring piston received therein, the pressure measuring cylinder and pressure measuring piston having diameters which are small compared to the diameter of the pressure cylinder.

This construction can be especially well connected with an actuating element of an electrical switch when, in accordance with an additional feature of the invention, the pressure measuring cylinder is formed by a borehole centrally disposed in the clamping disc.

In accordance with further features of the invention, the ring gear is clamped with a given clamping force between the gearwheel and the clamping disc by the plurality of spring-loaded clamping elements, and the pressure monitoring means comprises a pressure measuring cylinder and a pressure measuring piston received therein, the pressure measuring cylinder and pressure measuring piston having diameters which are small compared to the diameter of the pressure cylinder. This arrangement makes it possible for the switch to respond even in the case of a slight reduction in the connecting or coupling force, thereby reliably preventing start-up of the machine when the connecting or coupling force is inadequate.

In accordance with a concomitant feature of the invention, wherein each of the clamping elements is formed by a screw having a head with a cup spring disposed thereunder, and a clamping nut and a lock nut, respectively, threadedly secured on the screw.

Other features which are considered as characteristic for the invention are set forth in the appended claims.

Although the invention is illustrated and described herein as embodied in a device for adjusting a relative rotational position of a gearwheel and a ring gear which are coaxially mounted, it is nevertheless not intended to be limited to the details shown, since various modifications and structural changes may be made therein without departing from the spirit of the invention and within the scope and range of equivalents of the claims.

Figure 2:
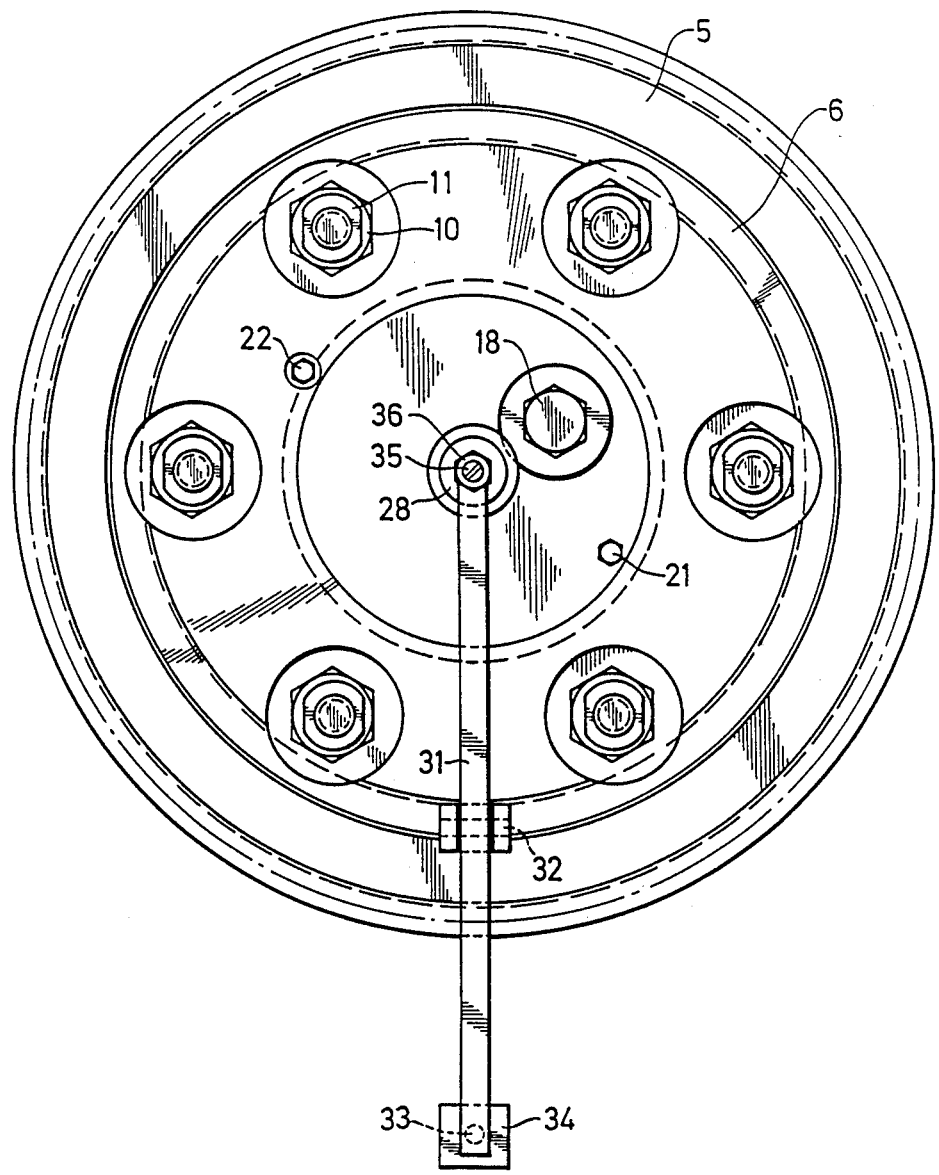

The construction and method of operation of the invention, however, together with additional objects and advantages thereof will be best understood from the following description of specific embodiments when read in connection with the accompanying drawings, in which:

FIG. 1 is a longitudinal sectional view of an embodiment of the device for adjusting the relative rotational position of a gearwheel and a ring gear which are coaxially mounted, in accordance with the invention; and FIG. 2 is a front elevational view of FIG. 1.

Identical parts have like reference numerals in the figures.

Referring now to the embodiment shown in FIGS. 1 and 2 of the drawing, a gearwheel 1 is arranged at an end of a shaft 2. Bearing mounts for the shaft 2, a turning drum carried by the shaft 2 as well as other parts of a printing machine are not shown since they are not required in order to explain the invention. The gearwheel 1 is held on the shaft 2 by several screws 3. A ring gear 5 is rotatably mounted on an annular shoulder or extension 4 of the gearwheel 1.

Several clamping elements 7 distributed about the circumference of a clamping disc 6 press the latter against a shoulder or extension of the ring gear 5 which, in turn, engages the gearwheel 1. A positive coupling or connection of the ring gear 5 with the gearwheel 1 is thereby ensured.

The clamping elements 7 are respectively formed of a bolt 7 having a disc-type head 8 which serves as a seat for a compression spring 9 assembled of cup or plate springs. Suitable recesses are provided in the gearwheel 1 for the compression springs 9 and the bolt heads 8 of the clamping elements 7. A clamping nut 10 is tightened to such an extent that the compression spring 9 exerts a required preloading. The nut 10 is fixed in position by a lock nut 11.

The hydraulic system described hereinbefore is used to release the coupling or connection. The clamping disc 6 has a middle portion constructed in the form of a working piston 12 which engages in a part of the gearwheel 1 formed as a working cylinder 13. A sealing ring 14 provides a seal between the working piston 12 and the wall of the cylinder 13. Furthermore, in an otherwise non-illustrated manner, the screws 3 are also sealed with respect to the gearwheel 1. Mounted in a borehole formed in the clamping disc 6 and serving as a pressure cylinder 16 is a pressure piston 15 which is sealed by a sealing ring 17 with respect to the wall defining the borehole. Arranged in a borehole coaxially with the pressure cylinder 16 and formed with a thread is a thrust bolt 18 which is constructed as a torque bolt in order to prevent excess pressure in the hydraulic system resulting from the bolt being overtightened.

Furthermore, bores 19 and 20 with corresponding locking screws or plugs 21 and 22, which facilitate filling of the system with hydraulic fluid 23 and which are also used to vent the system, are formed in the clamping disc 6.

The force achievable with the thrust bolt 18 is amplified in accordance with the ratio of the surfaces of the working piston 12 and the pressure piston 15. For this reason, the considerable clamping force produced by the clamping elements 7 can be overcome by a force which can easily be exerted by the operator.

To prevent the printing machine from starting up when the coupling or connection between the gearwheel 1 and the ring gear 5 is released or is insufficiently tight, a pressure monitoring cylinder is provided which is formed by a central bore 24 which is formed in the clamping disc 6. A pressure measuring piston 25 sliding in this central bore 24 with a sealing ring 26 is pushed by a coil spring 27 with slight force against the hydraulic fluid. This ensures that, when the bolt 18 is tightened, the pressure measuring piston 25 moves even before the connection or coupling begins to be released. Because the area of the piston 25 is considerably smaller than the area of the piston 15, even when the thrust bolt 18 is moved only slightly, a sufficient stroke is produced to operate an electrical switch 34.

A threaded sleeve 28 serves for receiving a coil spring 27 therein while acting as a limit stop for the pressure measuring piston 25. Introduced into the threaded sleeve 28 is a piston rod 29 which projects out of the threaded sleeve 28 at a slight excess pressure of the hydraulic system. Arranged opposite the piston rod 29 is a lever 31 which is pivotally mounted at 32 and which actuates an electrical switch 34 via an actuating element 33 when the piston rod 29 emerges. To facilitate adjustment of the switching point, a setscrew 35 with a lock nut 36 are provided at the end of the lever 31. A spring 37 is provided to return the lever 31. The movement of the lever 31 is furthermore limited by a limit stop 38.

The foregoing is a description corresponding in substance to German Application No. P 36 11 324.7, dated Apr. 4, 1986, the International priority of which is being claimed for the instant application, and which is hereby made part of this application. Any material discrepancies between the foregoing specification and the aforementioned corresponding German application are to be resolved in favor of the latter.

I claim:

1. Device for releasably setting a relative rotational position of a gearwheel and a ring gear which are coaxially mounted, comprising means for applying a spring force to at least one of the gear wheel and the ring gear so as to form a positive connection between the gear wheel and ring gear, and decoupling means for counteracting said spring force-applying means so as to reduce the spring force applied thereby, said decoupling means including a pressurized hydraulic fluid, a fully sealed pressure chamber wherein said hydraulic fluid is received, said pressure chamber being defined by the gearwheel and a clamping disc which presses the ring gear under the action of said spring force against the gearwheel, and adjusting means disposed in said clamping disc for adjusting the pressure of said hydraulic fluid received in said pressure chamber.

2. Device according to claim 1 wherein said pressure chamber comprises a working cylinder integrated in the gearwheel and having a working piston formed by said clamping disc displaceable therein, a pressure cylinder integrated in said clamping disc and having a pressure piston displaceable therein by a thrust bolt operatively engageable therewith, and a pressure monitoring cylinder also integrated in said clamping disc and having a pressure monitoring piston displaceable therein, said pressure monitoring piston being spring-preloaded so as to have a limited stroke.

3. Device according to claim 2, wherein the gearwheel is formed with an annular extension whereon the ring gear is mounted, said annular extension being formed with an inner chamber defining said working cylinder, and said clamping disc having a cylindrical extension forming the piston in said working cylinder.

4. Device according to claim 2, wherein said pressure cylinder has a smaller diameter than the diameter of said working cylinder.

5. Device according to claim 2, wherein said thrust bolt in constructed as a torque bolt.

6. Device according to claim 2, wherein said pressure monitoring means comprises a pressure measuring cylinder and a pressure measuring piston received therein, said pressure measuring cylinder and pressure measuring piston having diameters which are small compared to the diameter of said pressure cylinder.

7. Device according to claim 6, wherein said pressure measuring cylinder is formed by a borehole centrally disposed in said clamping disc.

8. Device according to claim 6, including a stationary electric switch, and wherein said pressure measuring piston is operatively engageable with said stationary electric switch.

9. Device according to claim 6, wherein said means for applying a spring force comprise a plurality of spring loaded clamping elements clamping the ring gear between the gearwheel and said clamping disc, and said pressure monitoring means include a spring exerting a force on said pressure measuring piston which corresponds to a force in said pressure chamber which is considerably smaller than a force corresponding to the clamping force of said spring loaded clamping elements.

10. Device according to claim 9 wherein said spring loaded clamping elements are disposed radially outwardly from said working piston and distributed about the periphery of said clamping disc.

* * * * *